US012801231B2

(12) United States Patent
Sim et al.

(10) Patent No.: US 12,801,231 B2
(45) Date of Patent: Nov. 17, 2026

(54) SYSTEMS FOR PROVIDING INPUTS FOR A COMPUTING DEVICE

(71) Applicant: Razer (Asia-Pacific) Pte. Ltd., Singapore (SG)

(72) Inventors: Alvin Sim, Singapore (SG); Lionel Lim, Singapore (SG); Kok Kiong Low, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 19/115,976

(22) PCT Filed: Dec. 2, 2022

(86) PCT No.: PCT/SG2022/050882

§ 371 (c)(1),
(2) Date: Mar. 27, 2025

(87) PCT Pub. No.: WO2024/117971

PCT Pub. Date: Jun. 6, 2024

(65) Prior Publication Data

US 2026/0104766 A1 Apr. 16, 2026

(51) Int. Cl.
*G06F 3/038* (2013.01)

(52) U.S. Cl.
CPC ...... *G06F 3/038* (2013.01); *G06F 2203/0384* (2013.01)

(58) Field of Classification Search
CPC ......................... G06F 3/038; G06F 2203/0384
See application file for complete search history.

(56) References Cited

U.S. PATENT DOCUMENTS 5,865,546 A 2/1999 Ganthier et al.
7,629,958 B1 * 12/2009 Nicolet .................. G06F 3/038 345/156

(Continued)

FOREIGN PATENT DOCUMENTS

CA 2870914 C 6/2018
CA 3093461 A1 3/2022

(Continued)

OTHER PUBLICATIONS

Supplementary Extended Search Report in corresponding European Patent Application No. 22967365.2 mailed Dec. 9, 2025, 9 pages.

(Continued)

*Primary Examiner* — Vinh T Lam
(74) *Attorney, Agent, or Firm* — Polsinelli PC

(57) ABSTRACT

A system for providing an input for a computing device is provided. The system may comprise a base station having a first interface having a transceiver, and at least one input module for connection to the base station. The at least one input module may comprise a second interface having a transceiver corresponding to the transceiver of the base station. The base station may be configured to detect configuration of the at least one input module in a manner that the transceiver of the base station is engaged with the transceiver of the at least one input module, thereby causing a first change in a first electromagnetic field in the transceiver of the at least one input module and/or the transceiver of the base station so as to establish electrical connection between the transceiver of the base station and the transceiver of the at least one input module.

18 Claims, 9 Drawing Sheets

(56) References Cited

U.S. PATENT DOCUMENTS

| | | | |
|---|---|---|---|
| 8,363,014 B2 | 1/2013 | Leung et al. | |
| 9,746,937 B2 | 8/2017 | Miller | |
| 9,798,380 B2 | 10/2017 | Chu et al. | |
| 10,013,051 B2 | 7/2018 | Chu et al. | |
| 10,075,814 B2 | 9/2018 | Sydir et al. | |
| 10,719,145 B1 * | 7/2020 | Files | G06F 1/169 |
| 10,795,832 B2 | 10/2020 | Beel et al. | |
| 10,985,619 B2 | 4/2021 | Walley et al. | |
| 2002/0008690 A1 * | 1/2002 | Cooper | G06F 3/0238 345/156 |
| 2004/0199328 A1 | 10/2004 | Croker | |
| 2005/0020225 A1 * | 1/2005 | Lazzarotto | H04B 1/0067 455/226.1 |
| 2006/0035590 A1 * | 2/2006 | Morris | H04W 52/28 710/1 |
| 2007/0132733 A1 * | 6/2007 | Ram | G06F 3/03544 345/163 |
| 2009/0031049 A1 * | 1/2009 | Lien | G06F 3/038 710/6 |
| 2009/0034209 A1 | 2/2009 | Joo et al. | |
| 2009/0098504 A1 * | 4/2009 | Hourmand | A61C 19/043 433/72 |
| 2014/0368412 A1 | 12/2014 | Jacobsen et al. | |
| 2015/0228132 A1 * | 8/2015 | Geerlings | G08C 17/02 340/5.22 |
| 2017/0256154 A1 | 9/2017 | Liang et al. | |
| 2018/0032457 A1 | 2/2018 | Mishra et al. | |
| 2018/0046244 A1 | 2/2018 | Chu et al. | |
| 2019/0178465 A1 * | 6/2019 | Huang | F21V 3/02 |
| 2019/0287330 A1 * | 9/2019 | Geerlings | G07C 9/00309 |
| 2020/0110475 A1 | 4/2020 | Files et al. | |
| 2020/0363876 A1 | 11/2020 | Conley | |
| 2020/0412157 A1 * | 12/2020 | Vlasov | H02J 50/80 |
| 2022/0027000 A1 | 1/2022 | Starrett et al. | |
| 2022/0413629 A1 * | 12/2022 | Momchilov | G06F 3/038 |
| 2023/0133414 A1 * | 5/2023 | Ho | G06F 3/0227 345/163 |
| 2024/0085995 A1 * | 3/2024 | Haran | G06F 3/03545 |

FOREIGN PATENT DOCUMENTS

| | | | |
|---|---|---|---|
| CN | 102724218 | A | 10/2012 |
| EP | 1340217 | A1 | 9/2003 |
| JP | 2004-199328 | A | 7/2004 |
| WO | 2010078094 | A1 | 7/2010 |
| WO | 2016005989 | A1 | 1/2016 |
| WO | 2020146895 | A1 | 7/2020 |
| WO | 2022119403 | A1 | 6/2022 |
| WO | 2022193811 | A1 | 9/2022 |

OTHER PUBLICATIONS

International Search Report; dated Aug. 23, 2023; Application # PCT/SG2022/050882.

Tap-to-Pair: Associating Wireless Devices with Synchronous Tapping; Tengxiang Zhang et al. (https://dl.acm.org/doi/abs/10.1145/3287079?casa_token=IflQucjzIDsAAAAA:PbPmyfcfTEznDSjEv44O2mwiqgQwTMKM_Ygv2ZISkFDJMujG9m1GZhc3wYWZBCG5-I7x-MtsUbVM2zM).

* cited by examiner

SYSTEMS FOR PROVIDING INPUTS FOR A COMPUTING DEVICE

TECHNICAL FIELD

Various embodiments relate to systems for providing inputs for a computing device.

BACKGROUND

Computer peripherals are continually being improved to enhance functionality and provide better user experiences. An input device includes any device used to provide data or control signals to an information processing system such as a computer. Input devices include joysticks, game controllers, keyboards, motion sensing devices or computer mice to receive user input. The input device may be used in various applications and thus need different functions.

Therefore, there exists a need for providing an improved system for providing inputs for computing devices.

SUMMARY

According to a first aspect of the present disclosure, a system for providing an input for a computing device is provided. The system may comprise a base station, wherein the base station comprises a first interface having a transceiver; and at least one input module for connection to the base station, wherein the at least one input module comprises a second interface having a transceiver corresponding to the transceiver of the base station, wherein the base station is configured to detect configuration of the at least one input module in a manner that the transceiver of the base station is engaged with the transceiver of the at least one input module, thereby causing a first change in a first electromagnetic field in the transceiver of the at least one input module and/or the transceiver of the base station so as to establish electrical connection between the transceiver of the base station and the transceiver of the at least one input module.

BRIEF DESCRIPTION OF THE DRAWINGS

In the drawings, like reference characters generally refer to like parts throughout the different views. The drawings are not necessarily to scale, emphasis instead generally being placed upon illustrating the principles of the disclosure. In the following description, various embodiments of the disclosure are described with reference to the following drawings, in which.

DETAILED DESCRIPTION

Figure 1:
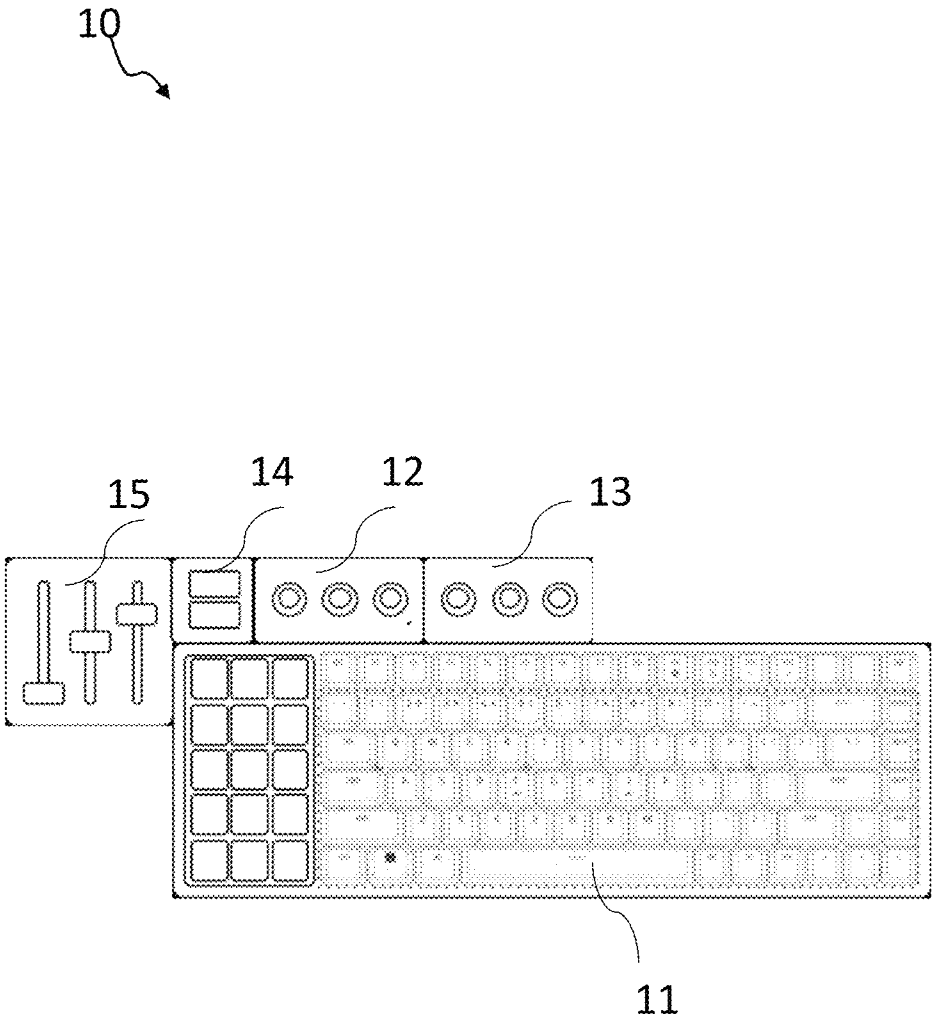
FIG. 1 shows a schematic diagram of an example system for providing inputs for a computing device, according to various embodiments.

The following detailed description refers to the accompanying drawings that show, by way of illustration, specific details, and embodiments in which the disclosure may be practiced. These embodiments are described in sufficient detail to enable those skilled in the art to practice the disclosure. Other embodiments may be utilized, and structural, logical, optical and electrical changes may be made without departing from the scope of the disclosure. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

It should be understood that the terms "on", "over", "top", "bottom", "down", "side", "back", "left", "right", "front", "back", "lateral", "side", "up", "down", "vertical", "horizontal" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the "or" is intended to incude "and" unless the context clearly indicates otherwise.

It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Approximating language, as used herein throughout the specification and claims, may be applied to modify any quantitative representation that could permissibly vary without resulting in a change in the basic function to which it is related. Accordingly, a value modified by a term or terms, such as "about," "substantially", is not limited to the precise value specified but within tolerances that are acceptable for the operation of the embodiment for an application for which it is intended. In some instances, the approximating language may correspond to the precision of an instrument for measuring the value.

The term "exemplary" may be used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [. . . ] , etc.). The term "a plurality" may be understood to include a numerical quantity greater than or equal to two (e.g., two, three, four, five, [. . . ] , etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of (objects)", "multiple (objects)") referring to a quantity of objects expressly refer to more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "first", "second", "third" detailed herein are used to distinguish one element from another similar element and may not necessarily denote order or relative importance, unless otherwise stated.

As used herein, the phrase of the form of "at least one of A or B" may include A or B or both A and B. Correspondingly, the phrase of the form of "at least one of A or B or C", or including further listed items, may include any and all combinations of one or more of the associated listed items.

As used herein, the term "connected", when used to refer to two electronic components or devices, means a bi-directional connection, the two electronic components or devices may communicate through the connection and either of the two electronic components or devices may transmit or receive signal or information from the other.

As used herein, the term "transmitter" refers broadly a component or device that transmits signal or information. As used herein, the term "receiver" refers broadly a component or device that receives signal or information.

As used herein, the term "engaged" may be understood as electrically engaged or as mechanically engaged, with reference to a component or device move into position as to come into operation with another component or device or activate another component or device (or being activated), for example attached or fixed, just in contact without any fixation, or just in the proximity without direct contact, and it will be understood that both direct engaged or indirect engaged (in other words: engaged without direct contact, e.g. through one or more intermediary elements) may be provided.

As used herein, the term "electromagnetic field" includes broadly electric field and/or magnetic field.

Various embodiments may provide modular systems for providing inputs for a computing device. The proposed module system may include a plurality of reconfigurable/detachable input modules with different types of user inputs, such as buttons, sliders, knobs, joysticks, trackballs, touch pads, touch screens, and other types of user interfaces. The plurality of input modules may include a master input module and one or more slave input modules connecting with the master input module wirelessly or by wired connection. The master input module may be configured to communicate to the computing device to which the master input module is wirelessly or by wired connected and relay input of the one or more slave input modules to the computing device. The plurality of reconfigurable/detachable input modules of the proposed modular system may provide flexibility and customization of input modules.

Various embodiments may provide systems for providing inputs for a computing device. The systems may include a base station (e.g. a master input module) and at least one input module (e.g. one or more slave modules interconnected with the master input module). The base station may include a first interface having a transceiver (e.g. a receiver or transmitter), and the at least one input module may include a second interface having a transceiver corresponding to the transceiver of the base station (e.g. a corresponding transmitter or a corresponding receiver) for connecting to the transceiver of the base station.

The base station may be configured to detect configuration of the at least one input module in a manner that the transceiver (e.g. the receiver or transmitter) of the base station is engaged with the corresponding transceiver (e.g. the corresponding transmitter or corresponding receiver) of the at least one input module, thereby causing a first change in a first electromagnetic field so as to establish electrical connection between the transceiver of the base station and the corresponding transceiver of the at least one input module. The first electromagnetic field may include either or both electromagnetic fields in the transceiver of the base station or the corresponding transceiver of the at least one input module.

In some embodiments, the transceiver of the base station may be a receiver and the transceiver of the at least one input module may be a transmitter. The receiver of the base station may include a reed switch and the transmitter of the at least one input module may include a magnet in a manner that the receiver of the base station is engaged with the transmitter of the at least one input module, thereby closing the reed switch. In some embodiments, the receiver of the base station may include a capacitive sensing receiver and the transmitter of the at least one input module may include a capacitive sensing transmitter in a manner that the receiver of the base station is engaged with the transmitter of the at least one input module, thereby causing a capacitive change between the capacitive sensing receiver and transmitter. As used herein, the capacitive sensing receiver and transmitter may be collectively called capacitive sensors.

According to various non-limiting embodiments, the transmitter (e.g. the reed switch, the capacitive sensing transmitter) of the at least one input module may be configured to send an interrupt to the base station to initiate a polling by the base station for the at least one input module. The base station may be configured to send an interrupt to the transmitter (e.g. the reed switch, the capacitive sensing transmitter) of the at least one input module requesting a factory default identifier and/or a user customizable identifier. The base station may be configured to detect configuration (e.g. position and orientation) of the at least one input module through the electrical connection between the receiver of the base station and the transmitter (e.g. the reed switch, the capacitive sensing transmitter) of the at least one input module. The base station may be further configured to provide the configuration (e.g. position and orientation) of the at least one input module to the at least one input module through the electrical connection between the receiver of the base station and the transmitter (e.g. the reed switch, the capacitive sensing transmitter) of the at least one input module.

There may not be a bus connection between the base station and the at least one input module. The configuration (e.g. position and orientation) of the at least one input module may be detected by the base station through the connection between the receiver of the base station and the transmitter (e.g. the reed switch, the capacitive sensing transmitter) of the at least one input module.

In the proposed systems of various embodiments, the at least one input module may include a battery. The battery may be built-in and wirelessly or wired chargeable. Accordingly, there may not be power exchange between the bast station and the at least one input module through the electrical connection between the receiver (or transmitter) of the base station and the corresponding transmitter (or corresponding receiver) of the at least one input module.

The following examples pertain to various aspects of the present disclosure.

Example 1 is a system for providing an input for a computing device, comprising: a base station, wherein the base station comprises a first interface having a transceiver; and at least one input module for connection to the base station, wherein the at least one input module comprises a second interface having a transceiver corresponding to the transceiver of the base station, wherein the base station is configured to detect configuration of the at least one input module in a manner that the transceiver of the base station is engaged with the transceiver of the at least one input module, thereby causing a first change in a first electromagnetic field in the transceiver of the at least one input module and/or the transceiver of the base station so as to establish electrical connection between the transceiver of the base station and the transceiver of the at least one input module.

In Example 2, the subject matter of Example 1 may optionally include that the transceiver of the base station is a receiver and the transceiver of the at least one input module is a transmitter, wherein the first interface of the base station further comprises a transmitter and the second interface of the at least one input module further comprises a receiver, wherein the base station is further configured to detect configuration of the at least one input module in a manner that the transmitter of the base station is engaged with the receiver of the at least one input module, thereby causing a second change in a second electromagnetic field in the transmitter of the base station and/or the receiver of the at least one input module so as to establish further electrical connection between the transmitter of the base station and the receiver of the at least one input module.

In Example 3, the subject matter of Example 2 may optionally include that the at least one input module further comprises a further interface having a further transmitter and a further receiver arranged at an edge of the at least one input module in a manner that the base station is configured to detect the configuration of the at least one input module by its interface.

In Example 4, the subject matter of Example 3 may optionally include that the at least one input module has a rectangular, hexagonal or square shape and has a further interface of transmitter and receiver arranged at each edge of the rectangular, hexagonal or square shape.

In Example 5, the subject matter of Example 3 may optionally include that the at least one input module comprises a first input module and a second input module, the first input module having the second interface and a further interface, the second input module having a third interface, wherein the base station is configured to detect configuration of the first input module through the second interface of the first input module, wherein the second input module is configured to connect to the first input module through the further interface of the first input module, and the base station is configured to detect configuration of the second input module via the first input module.

In Example 6, the subject matter of Example 2 may optionally include that the base station further comprises an additional interface having an additional transmitter and an additional receiver, and the at least one input module comprises a first input module and a second input module, the first input module having the second interface and the second input module having a third interface, wherein the base station is configured to detect configuration of the first input module through the first interface of the base station, wherein the base station is configured to detect configuration of the second input module through the additional interface of the base station.

In Example 7, the subject matter of Example 1 may optionally include that the receiver of the base station comprises a reed switch and the transmitter of the at least one input module comprises a magnet in a manner that the receiver of the base station is engaged with the transmitter of the at least one input module, thereby closing the reed switch.

In Example 8, the subject matter of Example 1 may optionally include that the receiver of the base station comprises a capacitive sensing receiver and the transmitter of the at least one input module comprises a capacitive sensing transmitter in a manner that the receiver of the base station is engaged with the transmitter of the at least one input module, thereby causing a capacitive change between the capacitive sensing receiver and transmitter.

In Example 9, the subject matter of Example 1 may optionally include that the base station is further configured to pair with the at least one input module, and wherein, after pairing, the base station is configured to wirelessly communicate with the at least one input module.

In Example 10, the subject matter of Example 9 may optionally include that the at least one input module comprises a first input module and a second input module, the first input module having the second interface and a further interface, and the second input module having a third interface, wherein the base station is configured to detect configuration of the first input module through the second interface of the first input module and further configured to pair and wirelessly communicate with the first input module, wherein the second input module is configured to connect to the first input module through the further interface of the first input module, and the base station is configured to detect configuration of the second input module via the first input module.

In Example 11, the subject matter of Example 1 may optionally include that the at least one input module comprises a built-in wirelessly or wired chargeable battery.

In Example 12, the subject matter of Example 1 may optionally include that the at least one input module comprises a factory default identifier, and a user customizable identifier is addable to the at least one input module.

In Example 13, the subject matter of Example 1 may optionally include that the configuration of the at least one input module comprises position and orientation of the at least one input module.

In Example 14, the subject matter of Example 1 may optionally include that the transmitter of the at least one input module is configured to send an interrupt to the base station to start polling for the at least one input module.

Example 15 is a method implemented in the system of Example 1, comprising: detecting, by the base station, configuration of the at least one input module in a manner that the transceiver of the base station is engaged with the transceiver of the at least one input module, thereby causing a first change in a first electromagnetic field in the transceiver of the at least one input module and/or the transceiver of the base station so as to establish electrical connection between the transceiver of the base station and the transceiver of the at least one input module.

In Example 16, the subject matter of Example 15 may optionally include sending by the transceiver of the at least one input module, an interrupt to the base station to start polling for the at least one input module.

In Example 17, the subject matter of Example 16 may optionally include sending, by the base station, an interrupt to the at least one input module to inquire for an identifier of the at least one input module.

In Example 18, the subject matter of Example 17 may optionally include assigning, by the base station, location and orientation information to the at least one input module.

In Example 19, the subject matter of Example 15 may optionally include that pairing the at least one input module with the base station; and wirelessly communicating between the base station and the at least one input module.

In Example 20, the subject matter of Example 19 may optionally include that the at least one input module comprises a first input module and a second input module, the first input module having the second interface and a further interface, and the second input module having a third interface, the method further comprising: detecting, by the base station, configuration of the first input module through the second interface of the first input module; pairing and wirelessly communicating between the base station and the first input module; connecting the second input module with the first input module through the further interface of the first input module; relaying, by the first input module, signals/information from the second input module to the base station; and detecting, by the base station, configuration of the second input module based on the signals/information relayed by the first input module.

Example 21 is a computer program comprising instructions to cause the system of claim 1 to execute the steps of the method of Example 15.

Example 22 is a computer-readable medium having stored thereon the computer program of Example 21.

In various embodiments, the systems for providing inputs for a computing device will now be described by way of the following non-limiting examples.

FIG. 1 shows a schematic diagram of an example system 10 for for providing inputs for a computing device (not shown), according to various embodiments. The system 10 may include a base station 11 and a plurality of input modules 12, 13, 14, 15 connected to the base station 11. One or more of the plurality of input modules 12, 13, 14, 15 may be operatively, wired connected to base station 11 or wirelessly connected to base station 11 including Zigbee, Bluetooth Low Energy (BLE)/Bluetooth, Wifi, Radio-frequency identification (RFID), Near Field Communication (NFC), 2.4 GHz Proprietary, 5 GHz Proprietary, 433 MHz Proprietary, Infrared Data Association (IRDA), Capacitive Sensing, for example.

According to various non-limiting embodiments, the base station 11 may be connected to a computing device such as a desktop or a laptop. The internal components of the base station 11 may include an electronic circuit module (not shown). The electronic circuit module may include printed circuit boards, or any other suitable electronic circuit. The computing device may include applications including, but not limited to, Word Processing, Development Tools, Games, Music, and Specialized Applications via a suitable application plug-in. The connection between the base station 11 and the computing device may be hardwired, for example, by Universal Serial Bus (USB), or may alternatively be a wireless connection made by any number of different types of short distance wireless connection, such as Zigbee, BLE/Bluetooth, Wifi, RFID, NFC, 2.4 GHz Proprietary, 5 GHz Proprietary, 433 MHz Proprietary, IRDA, Capacitive Sensing, for example.

According to various non-limiting embodiments, the plurality of input modules 12, 13, 14 and 15 may be reconfigurable including knobs, buttons, sliders, joysticks, trackballs, touch pads, touch screens and other types of user interfaces. The plurality of input modules may be generally square shaped, or of a rectangular shape which is the size of two square shaped modules placed together, and so forth. In alternative embodiments, it will be appreciated that the plurality of input modules may be other shapes that may detachably interconnect, such as a hexagonal shape to form a honey-comb pattern. The plurality of input modules may also be a mix of different shapes which are selected to allow detachable interconnection and reconfiguration.

Each of the plurality of input modules 12, 13, 14 and 15 may include a microcontroller that converts input provided by a user and received by the respective input module into a signal and sends the signal to the base station 11. The base station 11 may communicate the signal to the computing device that is connected to the base station 11 and consequently control the application(s) running on the computing device. Each of the plurality of input modules 12, 13, 14, 15 may be mapped to at least one application running on the computing device that the base station 11 is connected to. The plurality of input modules 12, 13, 14 and 15 may also include lighting effects that may illuminate as controlled by the base station 11 and/or the computing device. Any type of user interface that may be built into a system for providing an input for a computing device may be used.

Some features of the system 10 that are shown in FIG. 1 are not described in details for purpose of brevity and the system 10 may include further features not shown in FIG. 1. In some embodiments, the system 10 may include one or more input modules, such as one or more buttons, one or more joysticks, one or more sliders, one or more touch screens that may be connected to the system 10 and receive input from users. Systems for providing input for computing devices to which embodiment apply may have different shapes, different sizes, different numbers and/or placements of input modules, and/or other differences from system 10 shown in FIG. 1.

For example, the input modules 12, 13 are shown as knobs, the input module 14 is shown as buttons and the input module 15 is shown as sliders. The system 10 as shown in FIG. 1 has three input modules 12, 13, 14 arranged above the base station 10 and one input module 15 arranged in the proximity of the top-left corner of the base station 10; however, it shall not be limited to such a arrangement/configuration and include input module(s) with different position and/or orientation with respect to the base station 11.

In the context of various embodiments, "providing inputs for a computing device" may be understood as translating an input from a user (e.g. pressing a button) through an user interface (e.g. an input module) to the computing device, to which the user interface is connected to or a base station to which the user interface and the computing device are connected to and controlling one or more corresponding applications running on the computing device by the input from the user.

Figure 2:
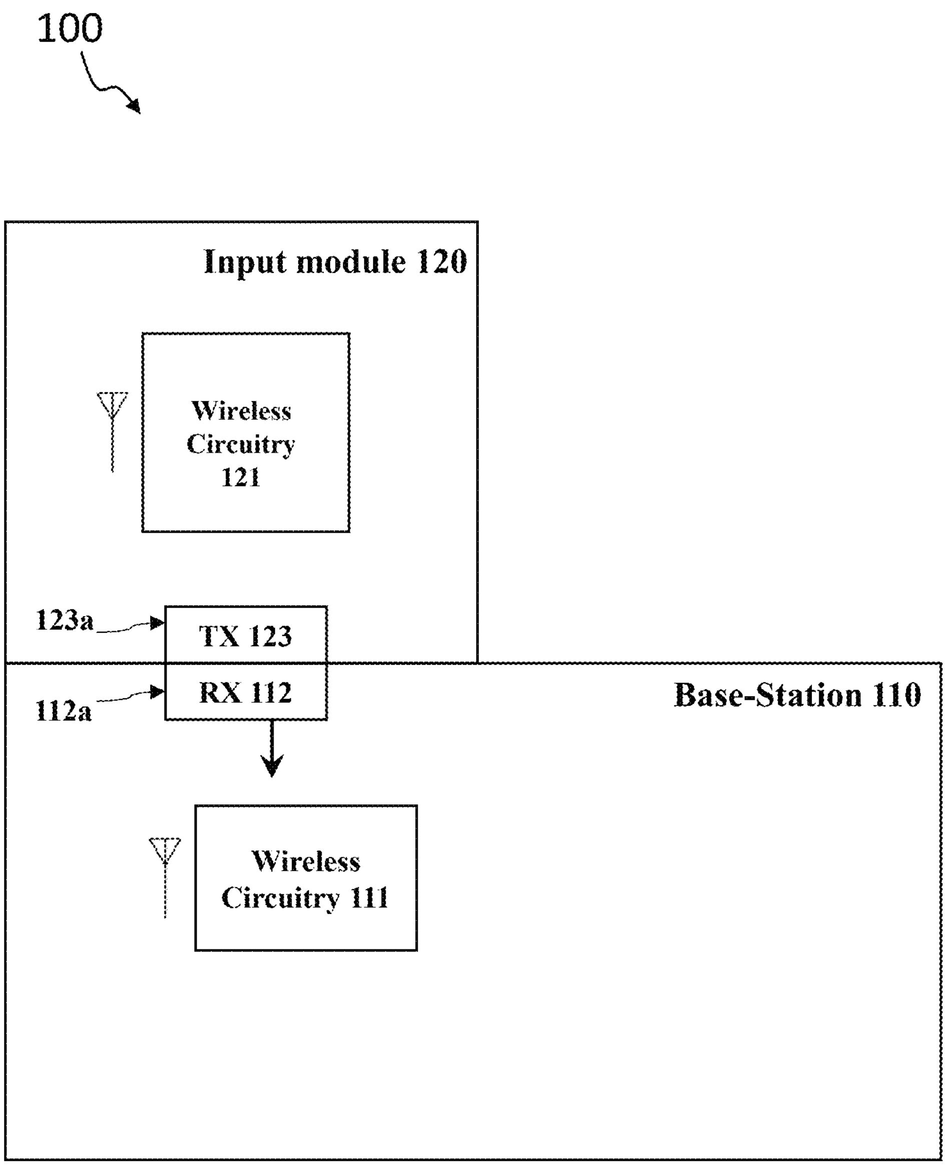
FIG. 2 shows a schematic diagram of an example system for providing inputs for a computing device, according to various embodiments.

FIG. 2 shows a schematic diagram of an example system 100 for providing inputs for a computing device, according to various embodiments.

According to various non-limiting embodiments, the system 100 may include a base station 110 and at least on input module 120. The base station 110 may include a first interface 112*a* having a receiver (RX) 112. The input module 120 may include a second interface 123*a* having a transmitter (TX) 123. It should be appreciated that although FIG. 1 shows the base station 110 includes the first interface 112*a* having the receiver (RX) 112 and the input module 120 includes the second interface 123*a* having the transmitter (TX) 123, the base station 110 may include the first interface 112*a* having a transmitter and the input module 120 may include the second interface 123*a* having a receiver. That is, the base station 110 may include the first interface 112*a* having a transceiver and the input module 120 may include the second interface 123*a* having a transceiver corresponding to the transceiver of the base station. For example, the base station 110 may include a transceiver-the receiver (RX) 112 and the input module 120 may include a corresponding transceiver-the transmitter (TX) 123. The base station 110 may be configured to detect configuration of the at least one input module 120 in a manner that the receiver 112 of the base station 110 is engaged with the transmitter 123 of the at least one input module 120. That the receiver 112 of the base station 110 is engaged with the second transmitter 123 of the input module 120 may include that the the receiver 112 of the base station 110 is connected with the second transmitter 123 of the input module 120, thereby causing a first change in a first electromagnetic field in the transmitter 123 of the at least one input module 120 so as to establish electrical connection between the receiver 112 of the base station 110 and the transmitter 123 of the at least one input module 120.

In various embodiments, the configuration of the at least one input module 120 may include position and orientation of the at least one input module 120. That may mean the base station 110 may be configured to detect position and orientation of the at least one input module 120 with respect to the base station 110. The input module 120, as shown in FIG. 2 is positioned above the base station 110 and orientated to the top-left of the base station 110. Accordingly, the base station 110 may be configured to determine the physical layout of all connected input modules and the types of connected input modules.

According to various non-limiting embodiments, the at least one input module 120 may include a factory default identifier, for example, a serial number as an default identifier of the input module 120 set by the factory that has manufactured the input module 120. A user of the system 100 may generate a user customizable identifier and add the user customizable identifier to the at least one input module 120. In case that a factory reset is needed, the user may identify the input module 120 by the user customizable identifier. The base station 110 may be configured to detect configuration of the at least one input module 120 so as to detect the factory default identifier of the at least one input module 120 (and/or the user customizable identifier) in a manner that the receiver 112 of the base station 110 is engaged with the transmitter 123 of the at least one input module 120.

According to various non-limiting embodiments, the transmitter 123 of the at least one input module 120 may be configured to send an interrupt to the base station 110 so as to initiate polling by the base station 110 for the at least one input module 120. The base station 110 may be configured to interrupt the at least one input 120 to obtain the factory default identifier of the at least one input module 120. The base station 110 may be further configured to send configuration information (e.g. position and orientation of the input module 120) of the at least one input module 120 to the at least one input module 120. The transmitter 123 of the at least one input module 120 may also receive detection and assignment commands from the base station 110, which respectively cause the transmitter 123 of the at least one input module 120 to detect newly plugged neighbouring input modules as described herein.

According to various non-limiting embodiments, the base station 110 may include a processor (not shown), a memory (not shown) and a wireless circuitry 111. The at least one input module 120 may include a microcontroller/microprocessor (not shown) and a wireless circuitry 121. The wireless circuitry 111 of the base station may be configured to wirelessly communicate with the wireless circuitry 121 of the at least one module 120 or by wire connection communicate with the at least one input module 120. The microcontroller of the at least one input module 120 may process input events (e.g. button presses, dial turns/presses, slider position, etc.) from the user and then send this data to the base station 110 (e.g. real-time or when queried). Additionally or alternatively, the microcontroller of the at least one input module 120 may cause the transmitter 123 of the at least one input module 120 to detect newly plugged neighbouring input modules as described herein, upon receiving detection and assignment commands from the base station 110.

According to various non-limiting embodiments, the base station 110 is further configured to communicate to a computing device to which the base station 110 is connected and provide input from the at least one input device 120 to the computing device. The base station 110 may connect to the computing device via a hardwired connection, such as USB cable. The connection may alternatively be a wireless connection made by any number of different types of short distance wireless connection, such as Wi-Fi, Bluetooth, BLE or NFC, for example. The base station 110 may communicate with the computing device using various protocols, for example: CDC/ACM (Communications Device Class/Abstract Control Model), HID (Human Interface Device), and MIDI (Musical Interface Digital Interface). The Master Module maintains communication over the CDC/ACM protocol, and can switch modes between HID, MIDI, or CDC/ACM.

According to various non-limiting embodiments, the receiver 112 of the base station may include a reed switch and the transmitter 123 of the at least one input module 120 may include a magnet in a manner that the receiver 112 of the base station 110 is engaged with the transmitter 123 of the at least one input module 120, thereby closing the reed switch. The reed switch may consist of two flat ferromagnetic reeds sealed in an inert atmosphere within a glass capsule. In the presence of a magnetic field the reeds may be attracted to each other and close to complete the magnetic and electric circuit.

Accordingly, that the receiver 112 of the base station 110 is engaged with the transmitter 123 of the at least one input module 120 may include that the reeds of the reed switch (i.e. the receiver 112) of the base station 110 is attracted to each other by the magnet (i.e. the transmitter 123) of the at least one input module 120 and close to complete the magnetic and electric circuit so as to establish the electrical connection between the receiver 112 of the base station 110 and the transmitter 123 of the at least one input module 120. Hence, the electromagnetic field (e.g. the magnetic field) in the reed switch (i.e. the receiver 112) of the base station 110 may change due to the receiver 112 of the base station 110 being engaged with the transmitter 123 of the at least one input module 120.

According to various non-limiting embodiments, the receiver 112 of the base station 110 may include a capacitive sensing (or capacitance sensing) receiver and the transmitter 123 of the at least one input module 120 may include a capacitive sensing transmitter in a manner that the receiver 112 of the base station 110 is engaged with the transmitter 123 of the at least one input module 120, thereby causing a capacitive change between the capacitive sensing receiver (i.e. the receiver 112) and transmitter (i.e. the transmitter 123). A capacitive sensor may be performing a measurement to detect a capacitive change to between the capacitive sensing receiver and transmitter.

Accordingly, that the receiver 112 of the base station 110 is engaged with the transmitter 123 of the at least one input module 120 may include that the capacitive sensing transmitter (i.e. the transmitter 123) of the at least one input module 120 is placed in the proximity of the capacitive sensing receiver (i.e. the receiver 112) of the base station 110 and cause a capacitive change so as to establish the electrical connection between the receiver 112 of the base station 110 and the transmitter 123 of the at least one input module 120. Hence, the electromagnetic field (e.g. the electric field) in the capacitive sensing transmitter (i.e. the transmitter 123) of the at least one input module 120 and/or the capacitive sensing receiver (i.e. the receiver 112) of the base station 110 may change due to the receiver 112 of the base station 110 being engaged with the transmitter 123 of the at least one input module 120.

Figure 3:
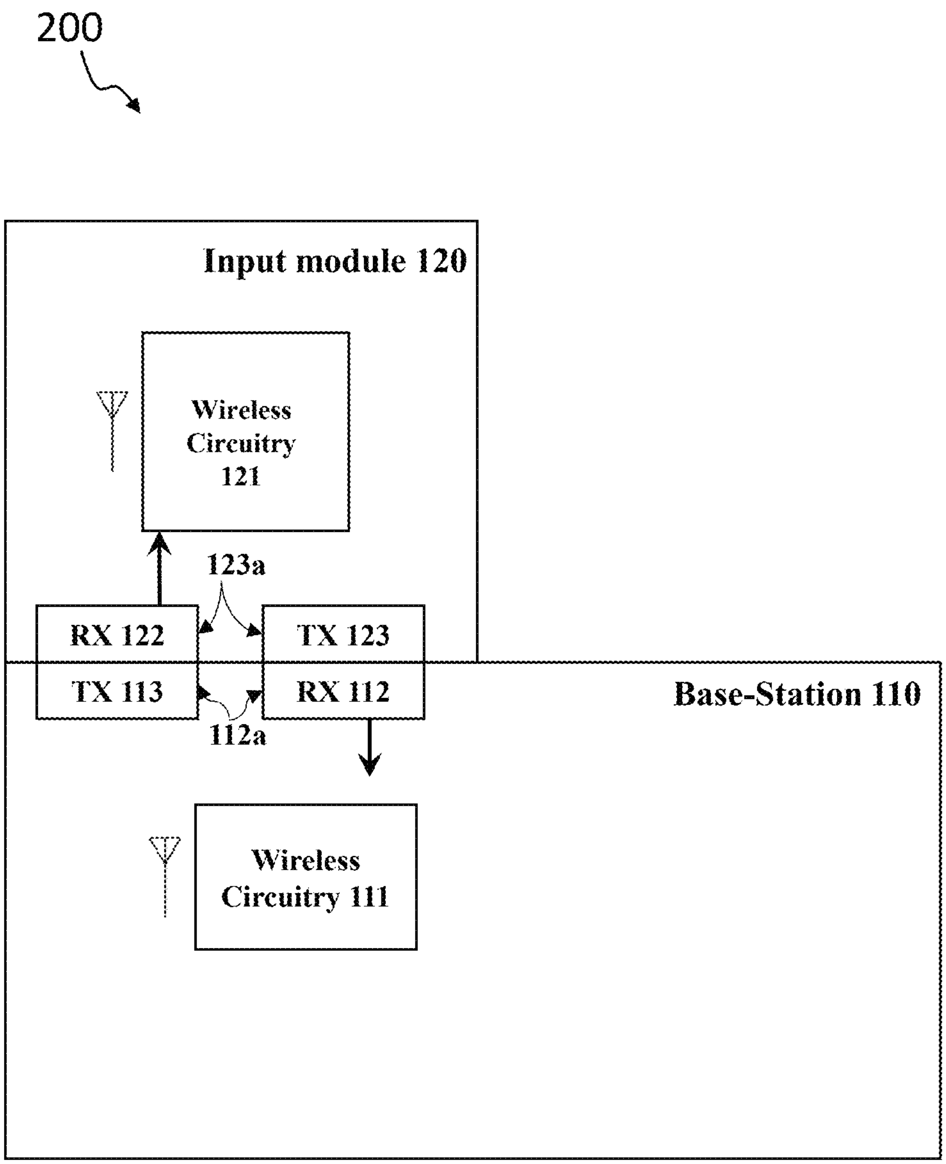
FIG. 3 shows a schematic diagram of an example system for providing inputs for a computing device, according to various embodiments.

FIG. 3 shows a schematic diagram of an example system 200 for providing inputs for a computing device, according to various embodiments. The system 200 may include the features of the system 100 as described above in connection to FIG. 2, and therefore, the common features are labelled with the same reference numerals and need not be discussed.

According to various non-limiting embodiments, the first interface 112*a* of the base station 110 may further include a transmitter 113 and the second interface 123*a* of the at least one input module 120 may further include a receiver 122. Hence, the first interface 112*a* of the base station 110 may include a pair of the receiver 112 and the transmitter 113, and the second interface 123*a* of the at least one input module 120 may include a pair of the receiver 122 and the transmitter 123.

According to various non-limiting embodiments, the base station 110 may be configured to detect configuration of the at least one input module 120 in a manner that the transmitter 113 of the base station 110 is engaged with the receiver 122 of the at least one input module 120. That the transmitter 113 of the base station 110 is engaged with the receiver 122 of the input module 120 may include that the the transmitter 113 of the base station 110 is connected with the receiver 122 of the input module 120, thereby causing a second change in a second electromagnetic field in the transmitter 113 of the base station 110 so as to establish electrical connection between the transmitter 113 of the base station 110 and the receiver 122 of the at least one input module 120.

In various embodiments, the first change in the first electromagnetic field in the second transmitter 123 of the at least one input module 120 may occur in a synchronous manner with the second change in the second electromagnetic field in the transmitter 113 of the base station 110. That may mean when the at least one input module 120 is connected to the base module 110, the receiver 112 of the base station 110 is engaged with the transmitter 123 of the at least one input module 120 in a synchronous manner with that the transmitter 113 of the base station 110 is engaged with the receiver 122 of the at least one input module 120. In alternate embodiments, when the at least one input module 120 is connected to the base module 110, the receiver 112 of the base station 110 is engaged with the transmitter 123 of the at least one input module 120 prior to or following that the transmitter 113 of the base station 110 is engaged with the receiver 122 of the at least one input module 120.

Features that are described in the context of the system 100 may correspondingly be applicable to the same or similar features in the system 200. Furthermore, additions and/or combinations and/or alternatives as described for a feature in the context of the system 100 may correspondingly be applicable to the same or similar feature in the system 200.

Figure 4:
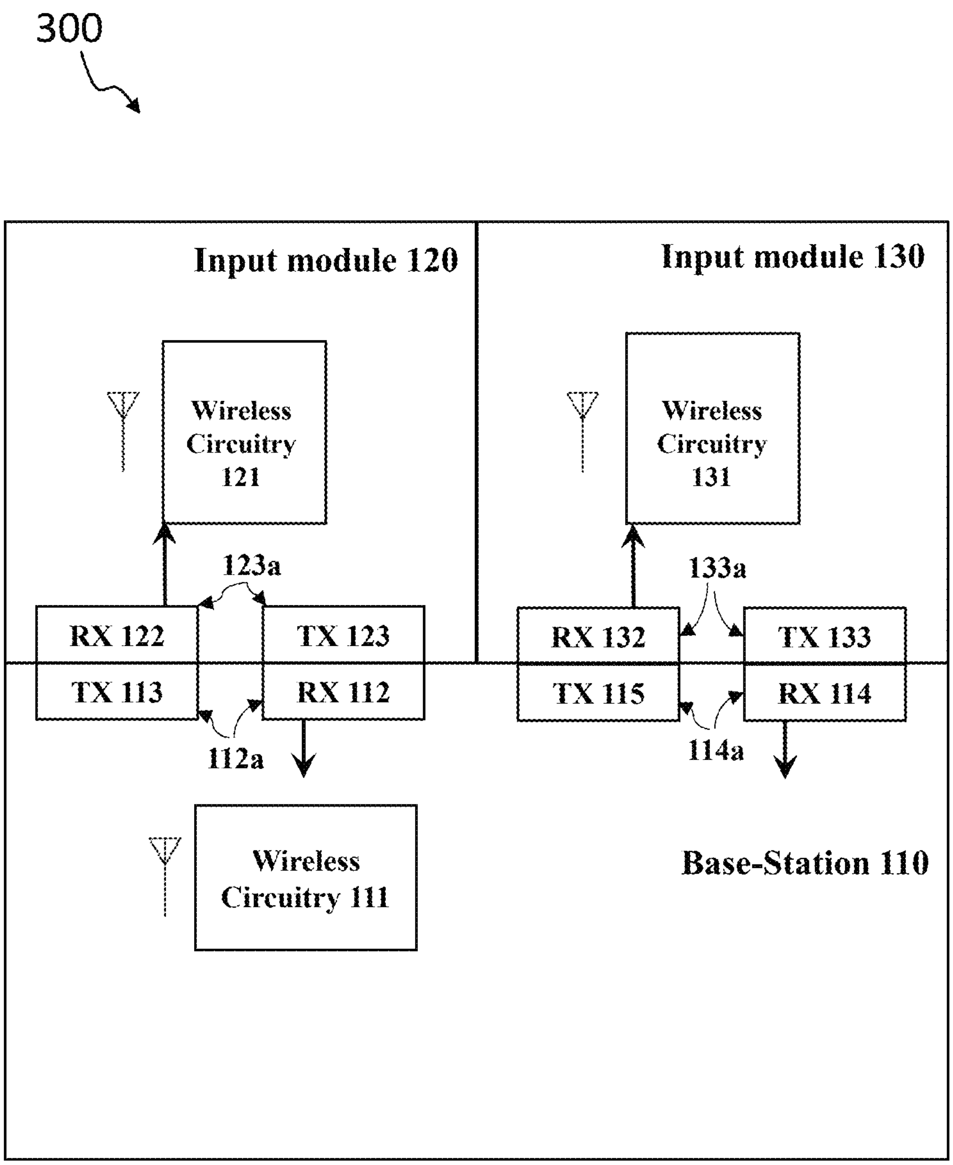
FIG. 4 shows a schematic diagram of an example system for providing inputs for a computing device, according to various embodiments.

FIG. 4 shows a schematic diagram of an example system 300 for providing inputs for a computing device, according to various embodiments. The system 300 may include the features of the system 100, 200 as described above in connection to FIGS. 2 and 3, and therefore, the common features are labelled with the same reference numerals and need not be discussed.

According to various non-limiting embodiments, the base station 110 may further include an additional interface 114*a* having an additional receiver 114 and an additional transmitter 115. The at least one input module may include a first input module 120 and a second input module 130, the first input module 120 having a second interface 123*a* and the second input module 130 having a third interface 133*a*. The third interface 133*a* of the second input module 130 may include a receiver 132 and a transmitter 133. The base station 110 may be configured to detect configuration of the first input module 120 through the first interface 112*a* of the base station as described herein, and further configured to detect configuration of the second input module 130 through the additional interface 114*a* of the base station 120.

According to various non-limiting embodiments, the base station 110 may be configured to detect configuration of the second input module 130 in a manner that the additional receiver 114 of the base station 110 is engaged with the transmitter 133 of the second input module 130. That the additional receiver 114 of the base station 110 is engaged with the transmitter 133 of the second input module 130 may include that the the additional receiver 114 of the base station 110 is connected with the transmitter 133 of the input module 130, thereby causing a third change in a third electromagnetic field in the transmitter 133 of the second input module 130 so as to establish electrical connection between the transmitter 133 of the second input module 130 and the additional receiver 114 of the base station 110.

According to various non-limiting embodiments, the base station 110 may be configured to detect configuration of the second input module 130 in a manner that the additional transmitter 115 of the base station 110 is engaged with the receiver 132 of the second input module 130. That the additional transmitter 115 of the base station 110 is engaged with the receiver 132 of the second input module 130 may include that the the additional transmitter 115 of the base station 110 is connected with the receiver 132 of the input module 130, thereby causing a fourth change in a fourth electromagnetic field in the additional transmitter 115 of the base station 110 so as to establish electrical connection between the receiver 132 of the second input module 130 and the additional transmitter 115 of the base station 110.

In various embodiments, the third change in the third electromagnetic field in the third tranmistter 133 of the second input module 130 may occur in a synchronous manner with the fourth change in the fourth electromagnetic field in the additional transmitter 115 of the base station 110. That may mean when the second input module 130 is connected to the base module 110, the additional receiver 114 of the base station 110 is engaged with the transmitter 133 of the second input module 130 in a synchronous manner with that the additional transmitter 115 of the base station 110 is engaged with the receiver 132 of the second input module 130. In alternate embodiments, when the second input module 130 is connected to the base module 110, the additional receiver 115 of the base station 110 is engaged with the transmitter 133 of the second input module 130 prior to or following that the additional transmitter 115 of the base station 110 is engaged with the receiver 132 of the second input module 130.

Features that are described in the context of the system 100, 200 may correspondingly be applicable to the same or similar features in the system 300. Furthermore, additions and/or combinations and/or alternatives as described for a feature in the context of the system 100, 200 may correspondingly be applicable to the same or similar feature in the system 300.

Figure 5:
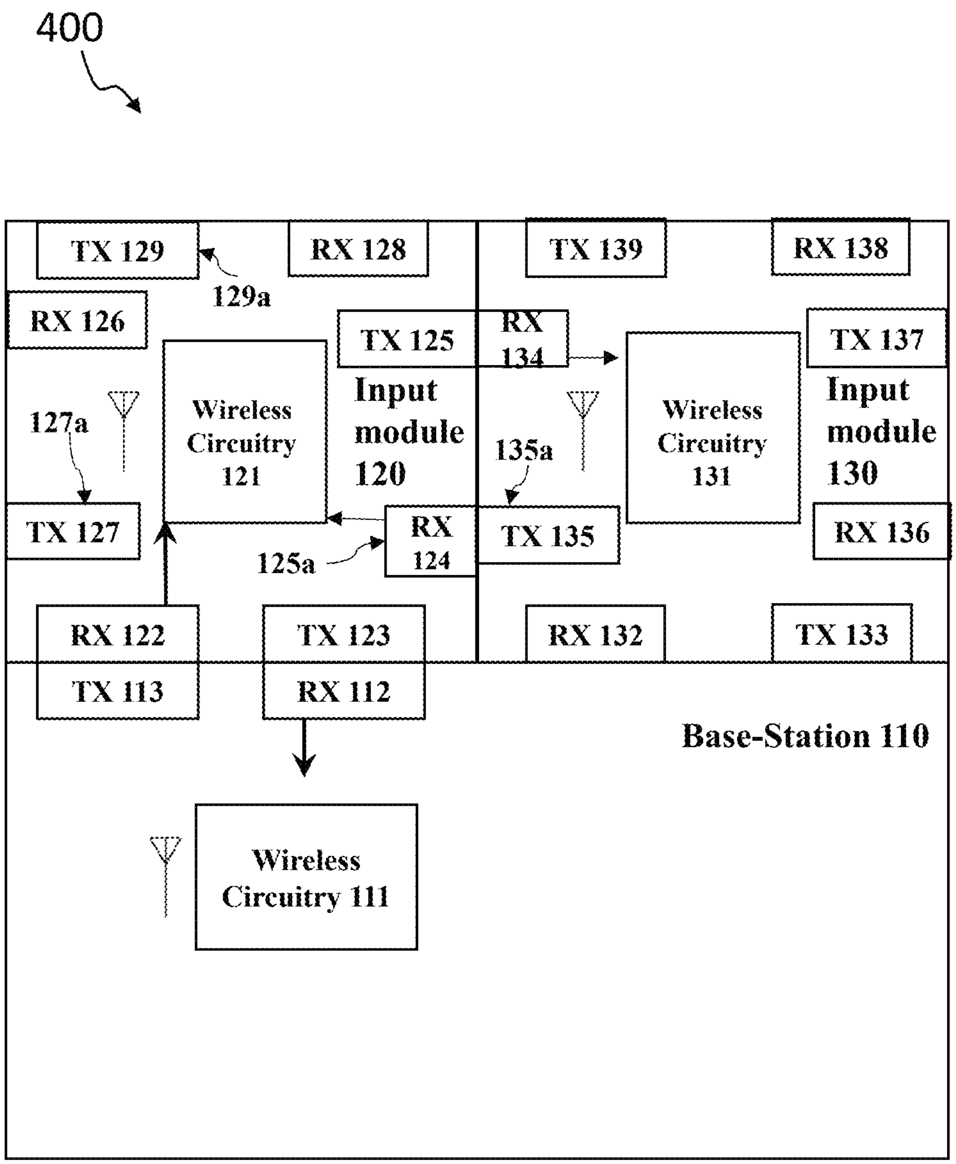
FIG. 5 shows a schematic diagram of an example system for providing inputs for a computing device, according to various embodiments.

FIG. 5 shows a schematic diagram of an example system 400 for providing inputs for a computing device, according to various embodiments. The system 400 may include the features of the system 100, 200, 300 as described above in connection to FIGS. 2, 3 and 3, and therefore, the common features are labelled with the same reference numerals and need not be discussed.

According to various non-limiting embodiments, the first input module 120 may further include a further interface 125*a* having a further transmitter 125 and a further receiver 124 arranged at an edge of the first input module 120. The second input module 130 may further include a further interface 135*a* having a further transmitter 135 and a further receiver 134 arranged at an edge of the second input module 130.

According to various non-limiting embodiments, the first input module 120 may have a rectangular, hexagonal or square shape and have a pair of transmitter and receiver arranged at each edge of the rectangular, hexagonal or square shape, e.g. the interface 123*a* having transmitter 123 and receiver 122, 125*a* having transmitter 125 and receiver 124, 127a having transmitter 127 and receiver 126, 129*a* having transmitter 129 and receiver 128 as shown in FIG. 5. The base station 110 may be configured to detect the configuration of the first input module 120 by its interface in a manner that base station 110 may be configured to detect a corresponding interface by detecting a receiver/transmiter of the corresponding interface with which the base station 120 is engaged. Hence, the base station 110 may be configured to detect the position and orientation of the input module 120 by its interface.

According to various non-limiting embodiments, the second input module 130 may be configured to connect to the first input module 120 through the further interface 125*a* of the first input module 120. Specifically, the transmitter 135 of the second input module 130 may be connected to the further receiver 124 of the first input module 120 and the receiver 134 of the second input module 130 may be connected to the further transmitter 125 of the first input module 120. The base station 110 may be configured to detect configuration of the second input module 130 via the first input module 120. That may mean the first input module may act as an intermediary, recevie signals/information from the second input module 130 and transmit the signals/information to the base station 110, and receive commands/information from the base station 110 and transmit the commands/information to the second input module 130.

Features that are described in the context of the system 100, 200, 300 may correspondingly be applicable to the same or similar features in the system 400. Furthermore, additions and/or combinations and/or alternatives as described for a feature in the context of the system 100, 200, 300 may correspondingly be applicable to the same or similar feature in the system 400.

Figure 6:
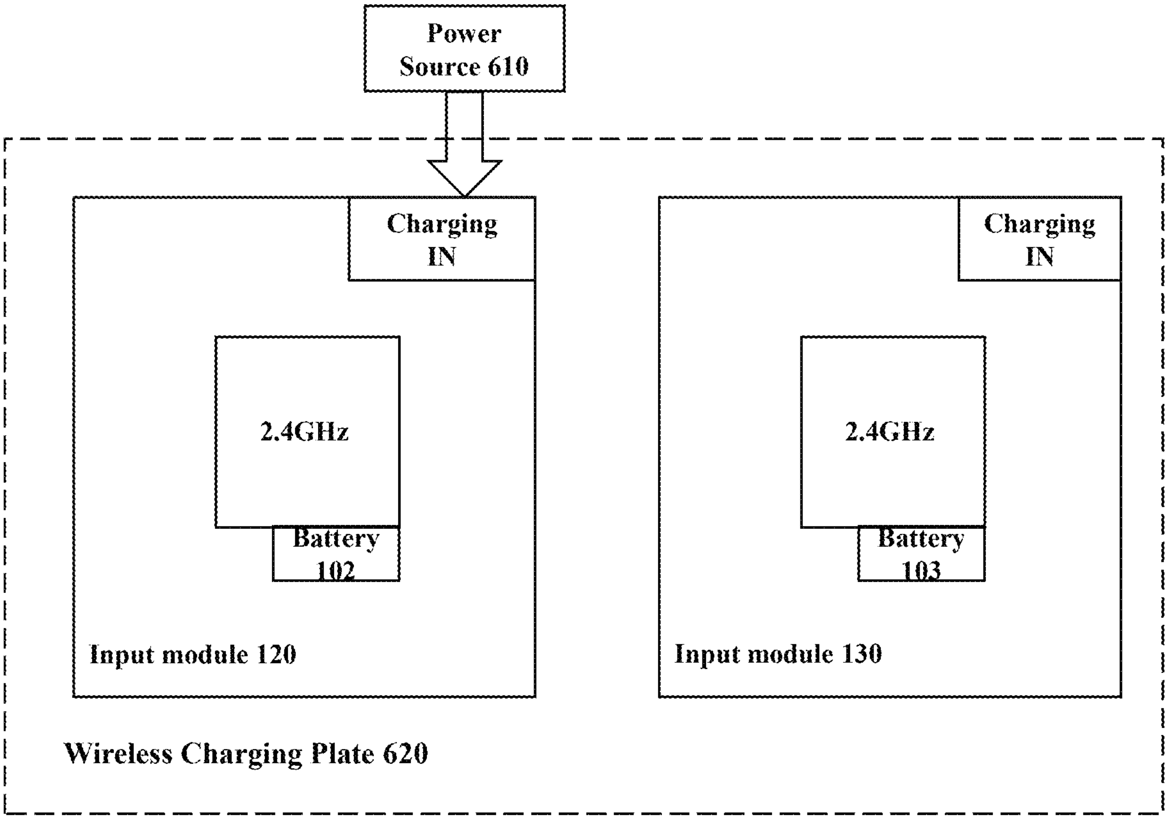
FIG. 6 shows a schematic diagram of an example input module, according to various embodiments.

FIG. 6 shows a schematic diagram of an example input module 120, 130, according to various embodiments.

According to various non-limiting embodiments, the input modules 120, 130 may include batteries 102, 103, respectively. The batteries 102, 103 may be built in the at least one input module and changeable. The batteries 102, 103 may be further chargeable by wired charging, for example, by a power adaptor, USB ports of a personal computer or a laptop, or a power bank. The batteries 102, 103 may be also chargeable by wireless charging, for example, by Qi technology, Power Matters Alliance, Proprietary Inductive charging. FIG. 6 shows the input modules 120, 130 are placed on top of a wireless charging plate 620 and, consequently, may be charged by the wireless charging plate 620 through wireless charging. FIG. 6 also shows the input module 120 may be charged by a power source 610 by wired charging, for example, by wired connection between the input module 120 and the power source 610.

According to various non-limiting embodiments, the batteries 102, 103 of the input modules 120, 130 may include a battery management module. The battery management module of the batteries 102, 103 may be configured to power down the batteries 102, 103 and consequently the input module 120, 130 to prevent glitches on the connection during input module connection/disconnection. The battery management module of the batteries 102, 103 may be further configured to switch the input module 120, 130 to a low-power transmitting mode while the input module 120, 130 is not in use (e.g. not in connection with the base station 110 or connected but inactive) so as to conserve power, switch the input module 120, 130 to a normal wireless pairing operation mode with data interaction, and any other mode if so designed. The battery management module of the batteries 102, 103 may be also configured to initiate charging when a state of charge of the batteries 102, 103 falls below a certain percentage (e.g. 10%, 5%) if a power supply is available.

Figure 7:
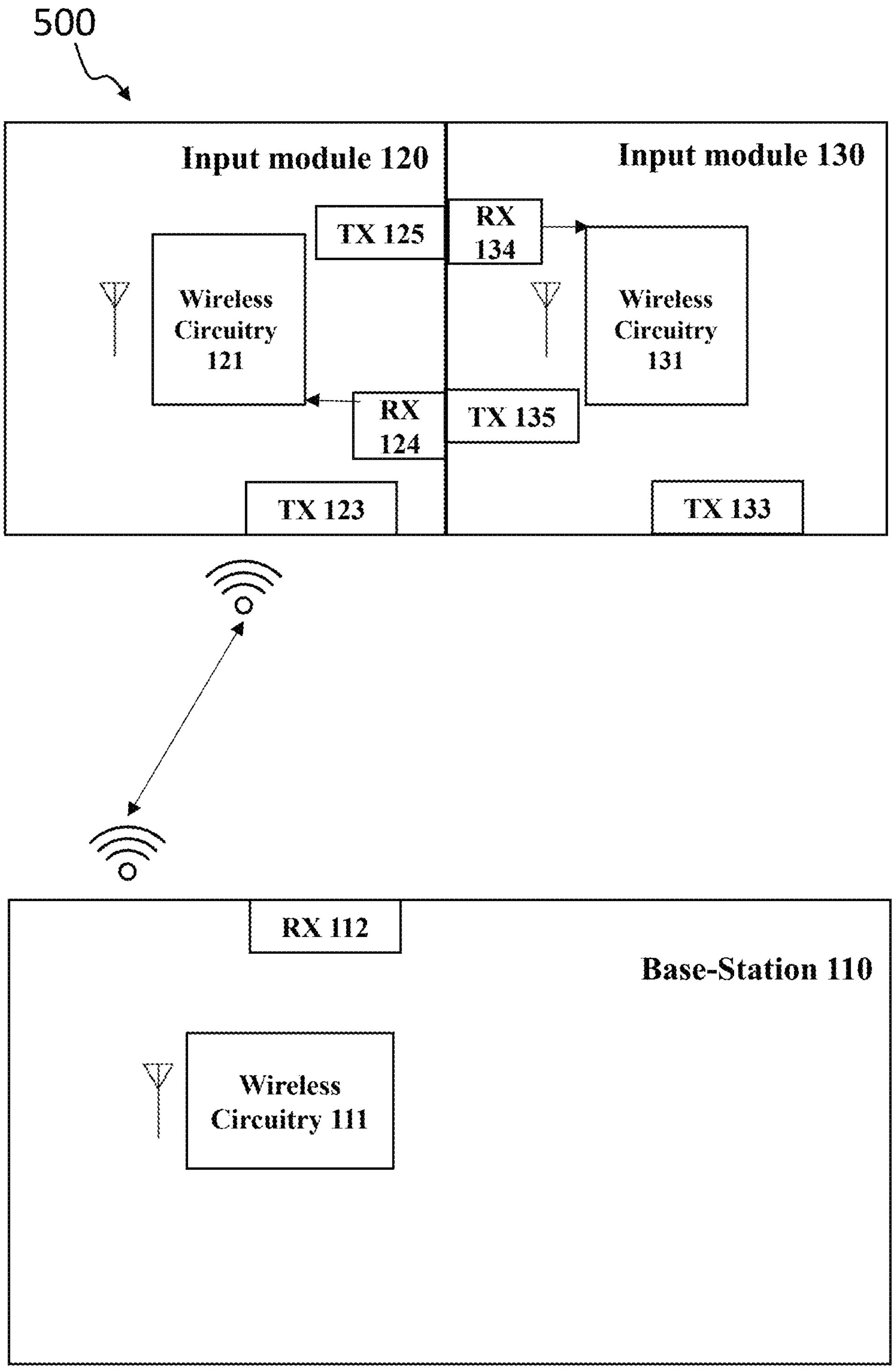
FIG. 7 shows a schematic diagram of an example system for providing inputs for a computing device, according to various embodiments.

FIG. 7 shows a schematic diagram of an example system 500 for providing inputs for a computing device, according to various embodiments. The system 500 may include the features of the system 100, 200, 400 as described above in connection to FIGS. 2, 3 and 5, and therefore, the common features are labelled with the same reference numerals and need not be discussed.

According to various non-limiting embodiments, the system 500 may include the base station 110, the first input module 120 and the second input module 130. The second input module 130 may be connected to the first input module 120 and configured to communicate with the base station 110 via the first input module 120. The base station 110 may be configured to detect configuration of the first input module 120 in a manner that the receiver 112 of the base station 110 is engaged with the transmitter 123 of the at least one input module 120. The base station 110 may be configured to detect configuration of the second input module 130 via the first input module 120. That may mean the first input module may act as an intermediary, recevie signals/information from the second input module 130 and transmit the signals/information to the base station 110, and receive commands/information from the base station 110 and transmit the commands/information to the second input module 130.

According to various non-limiting embodiments, the first input module 120 may be configured to pair with the base station 110 so as to facilitate wirelessly communication. The pairing process may be performed after the detection process as described herein. The first input module 120 may be configured to pair with the base station 110 by short range NFC, capacitive sensing, IRDA, and the like. The base station 110 may be configured to obtain the factory default identifier and/or the user customizable identifier from the first input module 120. The base station 110 may be configured to provide an identifier thereof to the first input module 120 prior to or upon receipt of the factory default identifier and/or the user customizable identifier from the first input module 120. That may mean that the base station 110 and the first input module 120 may exchange identifers during the pairing process. When pairing completes, the first input module 120 may receive a paired status from the base station 110, enabling these two devices to connect in the future without repeating the pairing process to confirm device identities. After pairing, the first input module 120 may communicate with the base station 110 within the wireless range of the base station 110.

According to various non-limiting embodiments, the second input module 130 may be configured to pair with the base station through the first input module 120. That may mean the first input module 120 may act as an intermediary, recevie a factory default identifier and/or a user customizable identifier of the secon input module 130 from the secon input module 130 and transmit the factory default identifier and/or the user customizable identifier of the secon input module 130 to the base station 110, and receive the identifier of the base station 110 from the base station 110 and transmit the the identifier of the base station 110 to the second input module 130. When pairing completes, the second input module 130 may receive a paired status from the base station 110 via the first input module 120. After pairing, the second input module 130 may communicate with the base station 110 within the wireless range of the base station 110.

Features that are described in the context of the system 100, 200, 400 may correspondingly be applicable to the same or similar features in the system 500. Furthermore, additions and/or combinations and/or alternatives as described for a feature in the context of the system 100, 200, 400 may correspondingly be applicable to the same or similar feature in the system 500.

Figure 8:
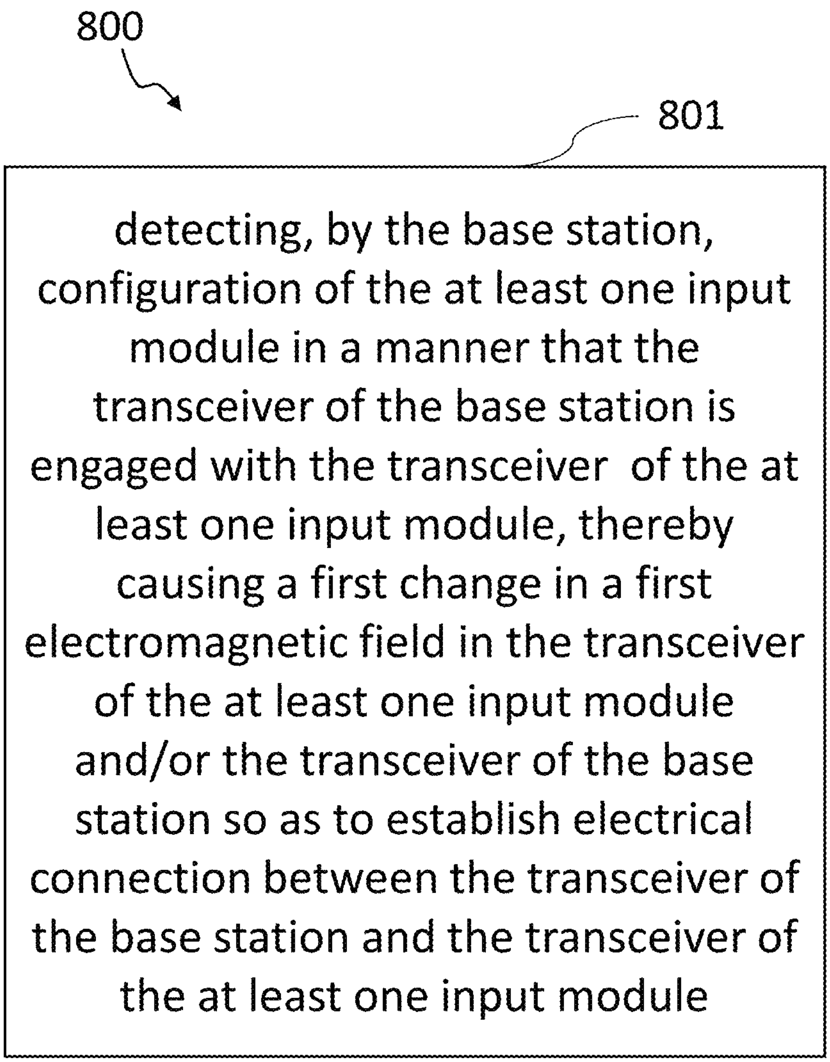
FIG. 8 shows a flow chart illustrating a method for providing an input for a computing device, according to various embodiments.

A method implemented in the systems of various embodiments for providing input for a computing device will now be described. FIG. 8 shows a flow chart illustrating a method 800 for providing an input for a computing device, according to various embodiments. The method 800 may be implemented in the systems 100, 200, 300, 400, 500.

At step 801, the method 800 may include detecting, by the base station, configuration of the at least one input module in a manner that the receiver of the base station is engaged with the transmitter of the at least one input module, thereby causing a first change in a first electromagnetic field in the transmitter of the at least one input module so as to establish electrical connection between the receiver of the base station and the transmitter of the at least one input module.

According to various non-limiting embodiments, the method 800 may include sending by the transmitter of the at least one input module, an interrupt to the base station to start polling for the at least one input module.

According to various non-limiting embodiments, the method 800 may include sending, by the base station, an interrupt to the at least one input module to inquire for an identifier of the at least one input module. The identifier of the at least one input module may include a factory default identifier, for example, a serial number as an default identifier of the input module set by the factory that has manufactured the input module. The identifier of the at least one input module may additionally or alternatively include a user customizable identifier generated by a user of the systems of various embodiments and added to the at least one input module.

According to various non-limiting embodiments, the method 800 may include assigning, by the base station, location and orientation information to the at least one input module. The method 800 may also include sending, by the base station, location and orientation information of the at least one input module to the at least one input module.

According to various non-limiting embodiments, the method 800 may include pairing the at least one input module with the base station; and wirelessly communicating between the base station and the at least one input module. The at least one input module may be placed onto a pairing port of the base station for pairing with the base station or pair with the base station by short range NFC, capacitive sensing, IRDA, and the like. After pairing, the at least one input module may communicate with the base station within the wireless range of the base station.

According to various non-limiting embodiments, the method 800 may include detecting, by the base station, configuration of the first input module through the second interface of the first input module and pairing and wirelessly communicating between the base station and the first input module. The method 800 may further include connecting the second input module with the first input module through the further interface of the first input module; relaying, by the first input module, signals/information from the second input module to the base station; and detecting, by the base station, configuration of the second input module based on the signals/information relayed by the first input module. That may mean the first input module may act as an intermediary, receive signals/information from the second input module and transmit the signals/information to the base station, and receive commands/information from the base station and transmit the commands/information to the second input module. Consequently, the method 800 may include pairing between the base station and the second input module through the first input module, and wirelessly and directly communicating between the base station and the second input module after pairing.

According to various non-limiting embodiments, the receiver of the base station may include a magnet and the transmitter of the at least one input module may include a reed switch in a manner that the receiver of the base station is engaged with the transmitter of the at least one input module, thereby closing the reed switch. The reed switch may consist of two flat ferromagnetic reeds sealed in an inert atmosphere within a glass capsule. In the presence of a magnetic field the reeds may be attracted to each other and close to complete the magnetic and electric circuit.

Accordingly, that the receiver of the base station is engaged with the transmitter of the at least one input module may include that the reeds of the reed switch (i.e. the transmitter) of the at least one input module is attracted to each other by the magnet (i.e. the receiver) of the base station and close to complete the magnetic and electric circuit so as to establish the electrical connection between the receiver of the base station and the transmitter of the at least one input module. Hence, the electromagnetic field (e.g. the magnetic field) in the reed switch (i.e. the transmitter) of the at least one input module may change due to the receiver of the base station being engaged with the transmitter of the at least one input module.

According to various non-limiting embodiments, the receiver of the base station may include a capacitive sensing (or capacitance sensing) receiver and the transmitter of the at least one input module may include a capacitive sensing transmitter in a manner that the receiver of the base station is engaged with the transmitter of the at least one input module, thereby causing a capacitive change between the capacitive sensing receiver (i.e. the receiver) and transmitter (i.e. the transmitter). A capacitive sensor may be performing a measurement to detect a capacitive change to between the capacitive sensing receiver and transmitter.

Accordingly, that the receiver of the base station is engaged with the transmitter of the at least one input module may include that the capacitive sensing transmitter (i.e. the transmitter) of the at least one input module is placed in the proximity of the capacitive sensing receiver (i.e. the receiver) of the base station and cause a capacitive change so as to establish the electrical connection between the receiver of the base station and the transmitter of the at least one input module. Hence, the electromagnetic field (e.g. the electric field) in the capacitive sensing transmitter (i.e. the transmitter) of the at least one input module and/or the capacitive sensing receiver (i.e. the receiver) of the base station may change due to the receiver of the base station being engaged with the transmitter of the at least one input module.

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

Figure 9:
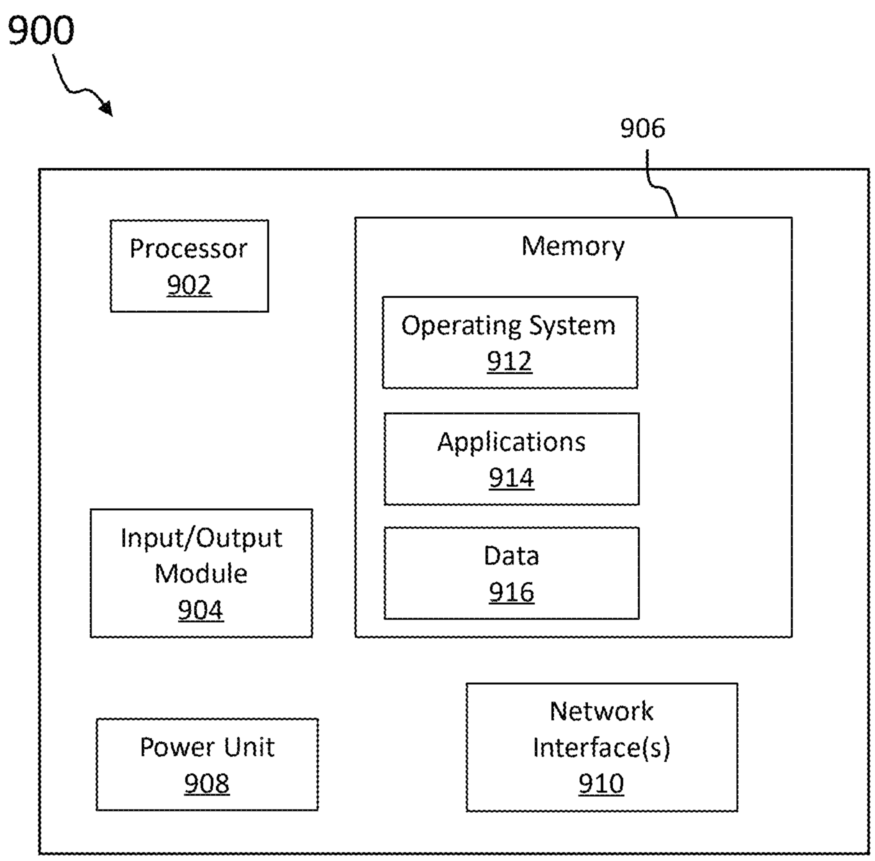
FIG. 9 is a block diagram showing an example electronic device, according to an embodiment of the present disclosure.

A computer program comprising instructions to cause the systems of various embodiments to execute the steps of the method 800 is also provided as described herein, for example with reference with FIG. 9.

A computer-readable medium having stored thereon the computer program of various embodiments is also provided as described herein, for example with reference with FIG. 9.

FIG. 9 is a block diagram showing an example electronic device, according to an embodiment of the present disclosure. The electronic device 900 may be a laptop computer, a desktop computer, a tablet computer, an automobile computer, a smart phone, a personal digital assistant, a server, or other electronic devices capable of running computer applications. In some implementations, the electronic device 900 includes a processor 902, an input/output (I/O) module 904, memory 906, a power unit 908, and one or more network interfaces 910. The electronic device 900 can include additional components. In some implementations, the processor 902, input/output (I/O) module 904, memory 906, power unit 908, and the network interface(s) 910 are housed together in a common housing or other array.

The example processor 902 can execute instructions, for example, to generate output data based on data inputs. The instructions can include programs, codes, scripts, modules, or other types of data stored in memory (e.g., memory 906). Additionally, or alternatively, the instructions can be encoded as pre-programmed or re-programmable logic circuits, logic gates, or other types of hardware or firmware components or modules. The processor 902 may be, or may include, a multicore processor having a plurality of cores, and each such core may have an independent power domain and can be configured to enter and exit different operating or performance states based on workload. Additionally, or alternatively, the processor 902 may be, or may include, a general-purpose microprocessor, as a specialized co-processor or another type of data processing apparatus. In some cases, the processor 902 performs high-level operation of the electronic device 900. For example, the processor 902 may be configured to execute or interpret software, scripts, programs, functions, executables, or other instructions stored in the memory 906.

The example I/O module 904 may include a mouse, keypad, touch screen, scanner, optical reader, and/or stylus (or other input device(s)) through which a user of the electronic device 900 may provide input to the electronic device 900 and may also include one or more of a speaker for providing audio output and a video display device for providing textual, audiovisual, and/or graphical output.

The example memory 906 may include computer-readable storage media, for example, a volatile memory device, a non-volatile memory device, or both. The memory 906 may include one or more read-only memory devices, random-access memory devices, buffer memory devices, or a combination of these and other types of memory devices. In some instances, one or more components of the memory can be integrated or otherwise associated with another component of the electronic device 900. The memory 906 may store instructions that are executable by the processor 902. In some examples, the memory 906 may store instructions for an operating system 912 and for application programs 914. The memory 906 may also store a database 916.

The example power unit 908 provides power to the other components of the electronic device 900. For example, the other components may operate based on electrical power provided by the power unit 908 through a voltage bus or other connection. In some implementations, the power unit 908 includes a battery or a battery system, for example, a rechargeable battery. In some implementations, the power unit 908 includes an adapter (e.g., an AC adapter) that receives an external power signal (from an external source) and coverts the external power signal to an internal power signal conditioned for a component of the electronic device 900. The power unit 908 may include other components or operate in another manner.

The electronic device 900 may be configured to operate in a wireless, wired, or cloud network environment (or a combination thereof). In some implementations, the electronic device 900 can access the network using the network interface(s) 910. The network interface(s) 910 can include one or more adapters, modems, connectors, sockets, terminals, ports, slots, and the like. The wireless network that the electronic device 900 accesses may operate, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, NFC, ZigBee), millimeter wave communications, and others. The wired network that the electronic device 900 accesses may, for example, include Ethernet, SONET, circuit-switched networks (e.g., using components such as SS7, cable, and the like), and others.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A system for providing an input for a computing device, comprising:

a base station, wherein the base station comprises a first interface having a transceiver; and at least one input module for connection to the base station, wherein the at least one input module comprises a second interface having a transceiver corresponding to the transceiver of the base station, wherein the base station is configured to detect configuration of the at least one input module in a manner that the transceiver of the base station is engaged with the transceiver of the at least one input module wherein the at least one input module further comprises a further interface having a further transmitter and a further receiver arranged at an edge of the at least one input module in a manner that the base station is configured to detect the configuration of the at least one input module by its interface, wherein the at least one input module comprises a first input module and a second input module, the first input module having the second interface and the further interface, the second input module having a third interface, wherein the base station is configured to detect configuration of the first input module through the second interface of the first input module, wherein the second input module is configured to connect to the first input module through the further interface of the first input module, and the base station is configured to detect configuration of the second input module via the first input module.

2. The system according to claim 1, wherein the transceiver of the base station is a receiver and the transceiver of the at least one input module is a transmitter, wherein the first interface of the base station further comprises a transmitter and the second interface of the at least one input module further comprises a receiver, wherein the base station is further configured to detect configuration of the at least one input module in a manner that the transmitter of the base station is engaged with the receiver of the at least one input module.

3. The system according to claim 1, wherein the at least one input module has a rectangular, hexagonal or square shape and has a further interface of transmitter and receiver arranged at each edge of the rectangular, hexagonal or square shape.

4. The system according to claim 2, wherein the base station further comprises an additional interface having an additional transmitter and an additional receiver, and the at least one input module comprises a first input module and a second input module, the first input module having the second interface and the second input module having a third interface, wherein the base station is configured to detect configuration of the first input module through the first interface of the base station, wherein the base station is configured to detect configuration of the second input module through the additional interface of the base station.

5. The system according to claim 1, wherein the receiver of the base station comprises a reed switch and the transmitter of the at least one input module comprises a magnet in a manner that the receiver of the base station is engaged with the transmitter of the at least one input module, thereby closing the reed switch.

6. The system according to claim 1, wherein the receiver of the base station comprises a capacitive sensing receiver and the transmitter of the at least one input module comprises a capacitive sensing transmitter in a manner that the receiver of the base station is engaged with the transmitter of the at least one input module, thereby causing a capacitive change between the capacitive sensing receiver and transmitter.

7. The system according to claim 1, wherein the base station is further configured to pair with the at least one input module, and wherein, after pairing, the base station is configured to wirelessly communicate with the at least one input module.

8. The system according to claim 7, wherein the base station is further configured to pair and wirelessly communicate with the first input module.

9. The system according to claim 1, wherein the at least one input module comprises a built-in wirelessly or wired chargeable battery.

10. The system according to claim 1, wherein the at least one input module comprises a factory default identifier, and a user customizable identifier is addable to the at least one input module.

11. The system according to claim 1, wherein the configuration of the at least one input module comprises position and orientation of the at least one input module.

12. The system according to claim 1, wherein the transmitter of the at least one input module is configured to send an interrupt to the base station to start polling for the at least one input module.

13. A method implemented in the system of claim 1, comprising:

detecting, by the base station, configuration of the at least one input module in a manner that the transceiver of the base station is engaged with the transceiver of the at least one input module.

14. The method according to claim 13, further comprising:

sending by the transceiver of the at least one input module, an interrupt to the base station to start polling for the at least one input module.

15. The method according to claim 14, further comprising:

sending, by the base station, an interrupt to the at least one input module to inquire for an identifier of the at least one input module.

16. The method according to claim 15, further comprising:

assigning, by the base station, location and orientation information to the at least one input module.

17. The method according to claim 13, further comprising:

pairing the at least one input module with the base station; and wirelessly communicating between the base station and the at least one input module, the method further comprising:

detecting, by the base station, configuration of the first input module through the second interface of the first input module;

pairing and wirelessly communicating between the base station and the first input module;

connecting the second input module with the first input module through the further interface of the first input module;

relaying, by the first input module, signals/information from the second input module to the base station; and detecting, by the base station, configuration of the second input module based on the signals/information relayed by the first input module.

18. A non-transitory computer readable medium storing computer program comprising instructions and a processor to cause the system of claim 1 to detect, by the base station, configuration of the at least one input module in a manner that the transceiver of the base station is engaged with the transceiver of the at least one input module.

* * * * *